United States Patent
Kish et al.

(10) Patent No.: US 9,484,638 B2
(45) Date of Patent: *Nov. 1, 2016

(54) TRANSMISSION AND RECEPTION PARAMETER CONTROL

(75) Inventors: William Kish, Saratoga, CA (US); Victor Shtrom, Sunnyvale, CA (US); John Chanak, Saratoga, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/340,425

(22) Filed: Dec. 29, 2011

(65) Prior Publication Data

US 2012/0094705 A1 Apr. 19, 2012

Related U.S. Application Data

(60) Division of application No. 12/545,796, filed on Aug. 21, 2009, which is a division of application No. 11/474,057, filed on Jun. 23, 2006, now Pat. No. 7,933,628, which is a continuation-in-part of application No. 11/180,329, filed on Jul. 12, 2005, now Pat. No. 7,899,497.

(51) Int. Cl.
*H04W 72/12* (2009.01)
*H01Q 21/29* (2006.01)
*H04B 7/06* (2006.01)
*H04B 17/24* (2015.01)
*H04B 17/318* (2015.01)

(52) U.S. Cl.
CPC .............. *H01Q 21/29* (2013.01); *H04B 7/061* (2013.01); *H04B 7/0689* (2013.01); *H04B 17/24* (2015.01); *H04B 17/318* (2015.01)

(58) Field of Classification Search
None
See application file for complete search history.

(56) References Cited

U.S. PATENT DOCUMENTS 4,027,307 A 5/1977 Litchford
4,176,356 A 11/1979 Foster et al.
(Continued)

FOREIGN PATENT DOCUMENTS

EP 0 352 787 7/1989
EP 0 534 612 3/1993
(Continued)

OTHER PUBLICATIONS

Areg Alimian et al., "Analysis of Roaming Techniques," doc.:IEEE 802.11-04/0377r1, Submission, Mar. 2004.
(Continued)

*Primary Examiner* — Rhonda Murphy
(74) *Attorney, Agent, or Firm* — Lewis Roca Rothgerber Christie LLP

(57) ABSTRACT

A system and method for implementing transmission parameter control at a transmitting station is described. The exemplary system and method comprises querying a transmission parameter control module for a transmission schedule. The transmission schedule comprises at least one schedule entry defining a set of transmission parameter controls as they pertain to a destination address. At least one packet of data is then transmitted to the destination address according to the transmission parameters controls of at least one schedule entry from the transmission schedule. A system and method for selecting an antenna configuration corresponding to a next transmission of packet data is also disclosed.

22 Claims, 8 Drawing Sheets

(56) References Cited

U.S. PATENT DOCUMENTS

| | | | |
|---|---|---|---|
| 4,193,077 A | 3/1980 | Greenberg et al. | |
| 4,253,193 A | 2/1981 | Kennard | |
| 4,305,052 A | 12/1981 | Baril et al. | |
| 4,513,412 A | 4/1985 | Cox | |
| 4,641,304 A * | 2/1987 | Raychaudhuri | 370/447 |
| 4,814,777 A | 3/1989 | Monser | |
| 5,097,484 A | 3/1992 | Akaiwa | |
| 5,173,711 A | 12/1992 | Takeuchi et al. | |
| 5,203,010 A | 4/1993 | Felix | |
| 5,220,340 A | 6/1993 | Shafai | |
| 5,373,548 A | 12/1994 | McCarthy | |
| 5,408,465 A | 4/1995 | Gusella et al. | |
| 5,453,752 A | 9/1995 | Wang et al. | |
| 5,507,035 A | 4/1996 | Bantz | |
| 5,559,800 A | 9/1996 | Mousseau et al. | |
| 5,697,066 A | 12/1997 | Acampora | |
| 5,754,145 A | 5/1998 | Evans | |
| 5,767,809 A | 6/1998 | Chuang et al. | |
| 5,802,312 A | 9/1998 | Lazaridis et al. | |
| 5,940,771 A | 8/1999 | Gollnick et al. | |
| 5,964,830 A | 10/1999 | Durrett | |
| 6,005,525 A | 12/1999 | Kivela | |
| 6,034,638 A | 3/2000 | Thiel et al. | |
| 6,094,177 A | 7/2000 | Yamamoto | |
| 6,169,888 B1 | 1/2001 | Lindenmeier et al. | |
| 6,249,216 B1 | 6/2001 | Flick | |
| 6,266,528 B1 | 7/2001 | Farzaneh | |
| 6,266,537 B1 | 7/2001 | Kashitani et al. | |
| 6,288,682 B1 | 9/2001 | Thiel et al. | |
| 6,292,153 B1 | 9/2001 | Aiello et al. | |
| 6,307,524 B1 | 10/2001 | Britain | |
| 6,317,599 B1 | 11/2001 | Rappaport et al. | |
| 6,326,922 B1 | 12/2001 | Hegendoerfer | |
| 6,337,628 B2 | 1/2002 | Campana, Jr. | |
| 6,337,668 B1 | 1/2002 | Ito et al. | |
| 6,339,404 B1 | 1/2002 | Johnson et al. | |
| 6,345,043 B1 | 2/2002 | Hsu | |
| 6,356,242 B1 | 3/2002 | Ploussios | |
| 6,356,243 B1 | 3/2002 | Schneider et al. | |
| 6,356,905 B1 | 3/2002 | Gershman et al. | |
| 6,377,227 B1 | 4/2002 | Zhu et al. | |
| 6,392,610 B1 | 5/2002 | Braun et al. | |
| 6,404,386 B1 | 6/2002 | Proctor, Jr. et al. | |
| 6,407,719 B1 | 6/2002 | Ohira et al. | |
| 6,442,507 B1 | 8/2002 | Skimore et al. | |
| 6,445,688 B1 | 9/2002 | Garces et al. | |
| 6,492,957 B2 | 12/2002 | Carillo, Jr. et al. | |
| 6,493,679 B1 | 12/2002 | Rappapport et al. | |
| 6,496,504 B1 | 12/2002 | Malik | |
| 6,498,589 B1 | 12/2002 | Horii | |
| 6,499,006 B1 | 12/2002 | Rappaport et al. | |
| 6,507,321 B2 | 1/2003 | Oberschmidt et al. | |
| 6,606,059 B1 | 8/2003 | Barabash | |
| 6,625,454 B1 | 9/2003 | Rappaport et al. | |
| 6,674,459 B2 | 1/2004 | Ben-Shachar et al. | |
| 6,701,522 B1 | 3/2004 | Rubin et al. | |
| 6,725,281 B1 | 4/2004 | Zintel et al. | |
| 6,753,814 B2 | 6/2004 | Killen et al. | |
| 6,762,723 B2 | 7/2004 | Nallo et al. | |
| 6,779,004 B1 | 8/2004 | Zintel | |
| 6,819,287 B2 | 11/2004 | Sullivan et al. | |
| 6,876,280 B2 | 4/2005 | Nakano | |
| 6,888,504 B2 | 5/2005 | Chiang et al. | |
| 6,888,893 B2 | 5/2005 | Li et al. | |
| 6,892,230 B1 | 5/2005 | Gu et al. | |
| 6,906,678 B2 | 6/2005 | Chen | |
| 6,910,068 B2 | 6/2005 | Zintel et al. | |
| 6,924,768 B2 | 8/2005 | Wu et al. | |
| 6,931,429 B2 | 8/2005 | Gouge et al. | |
| 6,941,143 B2 | 9/2005 | Mathur | |
| 6,950,019 B2 | 9/2005 | Bellone et al. | |
| 6,961,028 B2 | 11/2005 | Joy et al. | |
| 6,961,573 B1 | 11/2005 | Moon et al. | |
| 6,973,622 B2 | 12/2005 | Rappaport et al. | |
| 6,975,834 B1 | 12/2005 | Forster | |
| 7,034,770 B2 | 4/2006 | Yang et al. | |
| 7,043,277 B1 | 5/2006 | Pfister | |
| 7,050,809 B2 | 5/2006 | Lim | |
| 7,064,717 B2 | 6/2006 | Kaluzni et al. | |
| 7,085,814 B1 | 8/2006 | Ghandhi et al. | |
| 7,089,307 B2 | 8/2006 | Zintel et al. | |
| 7,130,895 B2 | 10/2006 | Zintel et al. | |
| 7,164,380 B2 | 1/2007 | Saito | |
| 7,171,475 B2 | 1/2007 | Weisman et al. | |
| 7,190,972 B1 | 3/2007 | Hollister et al. | |
| 7,206,610 B2 | 4/2007 | Iacono et al. | |
| 7,254,373 B2 | 8/2007 | Paljug et al. | |
| 7,333,460 B2 | 2/2008 | Vaisanen et al. | |
| 7,355,998 B2 | 4/2008 | Briancon et al. | |
| 7,385,962 B1 | 6/2008 | Valo et al. | |
| 7,596,388 B2 | 9/2009 | Willins et al. | |
| 7,609,648 B2 | 10/2009 | Hoffmann et al. | |
| 7,649,831 B2 | 1/2010 | Van Rensburg et al. | |
| 7,724,658 B1 | 5/2010 | Eiriksson et al. | |
| 7,773,557 B2 | 8/2010 | Grant et al. | |
| 7,782,895 B2 | 8/2010 | Pasanen et al. | |
| 7,835,697 B2 | 11/2010 | Wright | |
| 7,877,113 B2 | 1/2011 | Kish et al. | |
| 7,899,497 B2 | 3/2011 | Kish et al. | |
| 7,933,628 B2 | 4/2011 | Kish et al. | |
| 8,150,470 B2 | 4/2012 | Kish et al. | |
| 8,217,843 B2 | 7/2012 | Shtrom et al. | |
| 8,594,734 B2 | 11/2013 | Kish | |
| 8,792,414 B2 | 7/2014 | Kish | |
| 9,153,876 B2 | 10/2015 | Kish | |
| 2001/0012764 A1 | 8/2001 | Edwards et al. | |
| 2002/0031130 A1 | 3/2002 | Tsuchiya et al. | |
| 2002/0047800 A1 | 4/2002 | Proctor, Jr. et al. | |
| 2002/0080767 A1 | 6/2002 | Lee | |
| 2002/0084942 A1 | 7/2002 | Tsai et al. | |
| 2002/0105471 A1 | 8/2002 | Kojima et al. | |
| 2002/0112058 A1 | 8/2002 | Weisman et al. | |
| 2002/0119757 A1 | 8/2002 | Hamabe | |
| 2002/0142744 A1 | 10/2002 | Okanoue et al. | |
| 2002/0158798 A1 | 10/2002 | Chiang et al. | |
| 2002/0158801 A1 | 10/2002 | Crilly, Jr. et al. | |
| 2002/0170064 A1 | 11/2002 | Monroe et al. | |
| 2003/0017835 A1 * | 1/2003 | Bergel | H04B 7/0634 455/502 |
| 2003/0026240 A1 | 2/2003 | Eyuboglu et al. | |
| 2003/0030588 A1 | 2/2003 | Kalis et al. | |
| 2003/0038698 A1 | 2/2003 | Hirayama | |
| 2003/0063591 A1 | 4/2003 | Leung et al. | |
| 2003/0122714 A1 | 7/2003 | Wannagot et al. | |
| 2003/0162551 A1 | 8/2003 | Atarashi et al. | |
| 2003/0169330 A1 | 9/2003 | Ben-Shachar et al. | |
| 2003/0172114 A1 | 9/2003 | Leung | |
| 2003/0184490 A1 | 10/2003 | Raiman et al. | |
| 2003/0189514 A1 | 10/2003 | Miyano et al. | |
| 2003/0189521 A1 | 10/2003 | Yamamoto et al. | |
| 2003/0189523 A1 | 10/2003 | Ojantakanen et al. | |
| 2003/0210207 A1 | 11/2003 | Suh et al. | |
| 2003/0227414 A1 | 12/2003 | Saliga et al. | |
| 2003/0227880 A1 | 12/2003 | Heller et al. | |
| 2003/0228857 A1 | 12/2003 | Maeki | |
| 2004/0008614 A1 | 1/2004 | Matsuoka et al. | |
| 2004/0014432 A1 | 1/2004 | Boyle | |
| 2004/0017310 A1 | 1/2004 | Runkle et al. | |
| 2004/0017860 A1 | 1/2004 | Liu | |
| 2004/0027291 A1 | 2/2004 | Zhang et al. | |
| 2004/0027304 A1 | 2/2004 | Chiang et al. | |
| 2004/0032378 A1 | 2/2004 | Volman et al. | |
| 2004/0032872 A1 | 2/2004 | Dhara | |
| 2004/0036651 A1 | 2/2004 | Toda | |
| 2004/0036654 A1 | 2/2004 | Hsieh | |
| 2004/0041732 A1 | 3/2004 | Aikawa et al. | |
| 2004/0047296 A1 * | 3/2004 | Tzannes et al. | 370/252 |
| 2004/0048593 A1 | 3/2004 | Sano | |
| 2004/0058690 A1 | 3/2004 | Ratzel et al. | |
| 2004/0061653 A1 | 4/2004 | Webb et al. | |
| 2004/0070543 A1 | 4/2004 | Masaki | |
| 2004/0080455 A1 | 4/2004 | Lee | |
| 2004/0082356 A1 | 4/2004 | Walton et al. | |
| 2004/0095278 A1 | 5/2004 | Kanemoto et al. | |

(56) References Cited

U.S. PATENT DOCUMENTS

| | | |
|---|---|---|
| 2004/0114535 A1 | 6/2004 | Hoffmann et al. |
| 2004/0125777 A1 | 7/2004 | Doyle et al. |
| 2004/0132496 A1 | 7/2004 | Kim et al. |
| 2004/0162115 A1 | 8/2004 | Smith et al. |
| 2004/0165563 A1 | 8/2004 | Hsu et al. |
| 2004/0190477 A1 | 9/2004 | Olson et al. |
| 2004/0260800 A1 | 12/2004 | Gu et al. |
| 2005/0022210 A1 | 1/2005 | Zintel et al. |
| 2005/0032531 A1 | 2/2005 | Gong et al. |
| 2005/0041739 A1 | 2/2005 | Li et al. |
| 2005/0042988 A1 | 2/2005 | Hoek et al. |
| 2005/0053164 A1 | 3/2005 | Catreux et al. |
| 2005/0074018 A1 | 4/2005 | Zintel et al. |
| 2005/0083852 A1 | 4/2005 | Alastalo et al. |
| 2005/0097503 A1 | 5/2005 | Zintel et al. |
| 2005/0128988 A1 | 6/2005 | Simpson et al. |
| 2005/0135480 A1 | 6/2005 | Li et al. |
| 2005/0138137 A1 | 6/2005 | Encarnacion et al. |
| 2005/0138193 A1 | 6/2005 | Encarnacion et al. |
| 2005/0148306 A1 | 7/2005 | Hiddink |
| 2005/0153658 A1 | 7/2005 | Nagy |
| 2005/0180381 A1 | 8/2005 | Retzer et al. |
| 2005/0185707 A1 | 8/2005 | Hoo et al. |
| 2005/0188193 A1 | 8/2005 | Kuehnel et al. |
| 2005/0240665 A1 | 10/2005 | Gu et al. |
| 2005/0250544 A1 | 11/2005 | Grant et al. |
| 2005/0255892 A1* | 11/2005 | Wong et al. ............... 455/562.1 |
| 2005/0267935 A1 | 12/2005 | Ghandhi et al. |
| 2006/0094371 A1 | 5/2006 | Nguyen |
| 2006/0098607 A1 | 5/2006 | Zeng et al. |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0125601 A1* | 6/2006 | Onishi ......................... 340/5.72 |
| 2006/0168159 A1 | 7/2006 | Weisman et al. |
| 2006/0184660 A1 | 8/2006 | Rao et al. |
| 2006/0184661 A1 | 8/2006 | Weisman et al. |
| 2006/0184693 A1 | 8/2006 | Rao et al. |
| 2006/0199544 A1 | 9/2006 | Ramakrishna et al. |
| 2006/0224690 A1 | 10/2006 | Falkenburg et al. |
| 2006/0225107 A1 | 10/2006 | Seetharaman et al. |
| 2006/0227761 A1 | 10/2006 | Scott, III et al. |
| 2006/0239369 A1 | 10/2006 | Lee |
| 2006/0258304 A1 | 11/2006 | Moon et al. |
| 2006/0291434 A1 | 12/2006 | Gu et al. |
| 2007/0010271 A1 | 1/2007 | Roy |
| 2007/0026807 A1 | 2/2007 | Kish et al. |
| 2007/0027622 A1 | 2/2007 | Cleron et al. |
| 2007/0049208 A1 | 3/2007 | Kim et al. |
| 2007/0053295 A1* | 3/2007 | Cleveland et al. ........... 370/235 |
| 2007/0066320 A1 | 3/2007 | Padovani et al. |
| 2007/0115180 A1 | 5/2007 | Kish et al. |
| 2007/0135167 A1 | 6/2007 | Liu |
| 2007/0153916 A1 | 7/2007 | Demircin et al. |
| 2007/0191068 A1 | 8/2007 | Ochi et al. |
| 2007/0206695 A1* | 9/2007 | Ye et al. ....................... 375/267 |
| 2008/0008110 A1 | 1/2008 | Kishigami et al. |
| 2008/0013638 A1 | 1/2008 | Walton et al. |
| 2008/0070509 A1 | 3/2008 | Kish et al. |
| 2008/0080631 A1 | 4/2008 | Forenza et al. |
| 2008/0192683 A1 | 8/2008 | Han et al. |
| 2008/0212582 A1 | 9/2008 | Zwart et al. |
| 2009/0046802 A1 | 2/2009 | Subramaniam et al. |
| 2009/0080333 A1 | 3/2009 | Ozer et al. |
| 2009/0154359 A1 | 6/2009 | Strutt et al. |
| 2009/0285331 A1* | 11/2009 | Sugar et al. ................. 375/297 |
| 2009/0310590 A1 | 12/2009 | Kish et al. |
| 2010/0008343 A1 | 1/2010 | Kish et al. |
| 2010/0027496 A1 | 2/2010 | Higuchi et al. |
| 2010/0045480 A1 | 2/2010 | Vallapureddy et al. |
| 2010/0091749 A1 | 4/2010 | Kish et al. |
| 2010/0231473 A1 | 9/2010 | Shtrom et al. |
| 2011/0306293 A1 | 12/2011 | Miller |
| 2012/0039259 A1 | 2/2012 | Kish et al. |
| 2014/0169497 A1 | 6/2014 | Kish |

FOREIGN PATENT DOCUMENTS

| | | |
|---|---|---|
| EP | 1 315 311 | 5/2003 |
| EP | 1 450 521 | 8/2004 |
| EP | 1 608 108 | 12/2005 |
| EP | 1 782 639 | 6/2015 |
| JP | 2003-038933 | 7/1989 |
| JP | 2008-088633 | 2/1996 |
| JP | 2001-057560 | 2/2002 |
| JP | 2005-354249 | 12/2005 |
| JP | 2006-060408 | 3/2006 |
| WO | WO 02/25967 | 3/2002 |
| WO | WO 03/079484 | 9/2003 |
| WO | WO 2005/114874 | 12/2005 |
| WO | WO 2006/023239 | 3/2006 |
| WO | WO 2007/018864 | 2/2007 |

OTHER PUBLICATIONS

Chang, Nicholas B. et al., "Optimal Channel Probing and Transmission Scheduling for Opportunistics Spectrum Access," Sep. 2007.

Cisco Systems, "Cisco Aironet Access Point Software Configuration Guide: Configuring Filters and Quality of Service," Aug. 2003.

Dell Inc., "How Much Broadcast and Multicast Traffic Should I Allow in My Network," PowerConnect Application Note #5, Nov. 2003.

Dunkels, Adam et al., "Connecting Wireless Sensornets with TCP/IP Networks," Proc. of the 2d Int'l Conf. on Wired Networks, Frankfurt, Feb. 2004.

Dunkels, Adam et al., "Making TCP/IP Viable for Wireless Sensor Networks," Proc. of the 1st Euro. Workshop on Wireless Sensor Networks, Berlin, Jan. 2004.

Dutta, Ashutosh et al., "MarconiNet Supporting Streaming Media Over Localized Wireless Multicast," Proc. of the 2d Int'l Workshop on Mobile Commerce, 2002.

Festag, Andreas, "What is MOMBASA?" Telecommunication Networks Group (TKN), Technical University of Berlin, Mar. 7, 2002.

Golmie, Nada, "Coexistence in Wireless Networks: Challenges and System-Level Solutions in the Unlicensed Bands," Cambridge University Press, 2006.

Hewlett Packard, "HP ProCurve Networking: Enterprise Wireless LAN Networking and Mobility Solutions," 2003.

Hirayama, Koji et al., "Next-Generation Mobile-Access IP Network," Hitachi Review vol. 49, No. 4, 2000.

Ian R. Akyildiz, et al., "A Virtual Topology Based Routing Protocol for Multihop Dynamic Wireless Networks," Broadband and Wireless Networking Lab, School of Electrical and Computer Engineering, Georgia Institute of Technology, no date.

Information Society Technologies Ultrawaves, "System Concept/Architecture Design and Communication Stack Requirement Document," Feb. 23, 2004.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Mawa, Rakesh, "Power Control in 3G Systems," Hughes Systique Corporation, Jun. 28, 2006.

Microsoft Corporation, "IEEE 802.11 Networks and Windows XP," Windows Hardware Developer Central, Dec. 4, 2001.

Pat Calhoun et al., "802.11r strengthens wireless voice," Technology Update, Network World, Aug. 22, 2005, http://www.networkworld.com/news/tech/2005/082208techupdate.html.

Steger, Christopher et al., "Performance of IEEE 802.11b Wireless LAN in an Emulated Mobile Channel," 2003.

Toskala, Antti, "Enhancement of Broadcast and Introduction of Multicast Capabilities in RAN," Nokia Networks, Palm Springs, California, Mar. 13-16, 2001.

Tsunekawa, Kouichi "Diversity Antennas for Portable Telephones," 39th IEEE Vehicular Technology, May 1-3, 1989, San Francisco, CA.

(56) References Cited

OTHER PUBLICATIONS

Vincent D. Park, et al., "A Performance Comparison of the Temporally-Ordered Routing Algorithm and Ideal Link-State Routing," IEEE, Jul. 1998, pp. 592-598.
Wennstrom, Mattias et al., "Transmit Antenna Diversity in Ricean Fading MIMO Channels with Co-Channel Interference," 2001.
Decision on Request for Rehearing from Board of Patent Appeal and Interferences mailed Sep. 28, 2011 in U.S. Appl. No. 95/001,078.
Examiner's Answer to Appeal Brief mailed Sep. 2, 2011 in U.S. Appl. No. 11/413,293.
PCT/US2005/026933, Search Report and Written Opinion mailed Feb. 22, 2006.
PCT/US2006/026418, Search Report and Written Opinion mailed Jan. 17, 2008.
U.S. Appl. No. 11/180,329, Office Action mailed Jun. 22, 2010.
U.S. Appl. No. 11/180,329, Final Office Action mailed Dec. 24, 2009.
U.S. Appl. No. 11/180,329, Office Action mailed Apr. 22, 2009.
U.S. Appl. No. 11/180,329, Office Action mailed Nov. 28, 2007.
U.S. Appl. No. 12/283,223, Final Office Action mailed Aug. 4, 2010.
U.S. Appl. No. 12/283,223, Office Action mailed Apr. 26, 2010.
U.S. Appl. No. 12/283,223, Final Office Action mailed Jan. 7, 2010.
U.S. Appl. No. 12/283,223, Office Action mailed May 26, 2009.
U.S. Appl. No. 12/545,796, Office Action mailed Feb. 28, 2012.
U.S. Appl. No. 12/575,422, Final Office Action mailed Mar. 23, 2012.
U.S. Appl. No. 11/413,293, Final Office Action mailed Aug. 27, 2010.
U.S. Appl. No. 11/413,293, Office Action mailed May 11, 2010.
U.S. Appl. No. 11/413,293, Office Action mailed Oct. 30, 2009.
U.S. Appl. No. 12/562,061, Final Office Action mailed Aug. 27, 2010.
U.S. Appl. No. 12/562,061, Office Action mailed May 12, 2010.
U.S. Appl. No. 11/841,619, Office Action mailed Jul. 17, 2012.
U.S. Appl. No. 11/841,619, Final Office Action mailed Jul. 1, 2011.
U.S. Appl. No. 11/841,619, Office Action mailed Jan. 20, 2011.
U.S. Appl. No. 11/841,619, Final Office Action mailed Nov. 8, 2012.
U.S. Appl. No. 13/282,157, Final Office Action mailed Aug. 2, 2012.
U.S. Appl. No. 13/282,157, Office Action mailed Apr. 11, 2012.
U.S. Appl. No. 11/474,057, Office Action mailed Jul. 21, 2010.
U.S. Appl. No. 11/841,619, Office Action mailed Apr. 18, 2013.
Chu, S.H. et al., "Performance Enhancement by Using Switch-Beam Smart Antenna in 802.11a WLAN System," IEEE/ACES International Conference on Wireless Communications and Applied Computational Electromagnetics, pp. 1101-1105, Apr. 3-7, 2005.
Office Action mailed Aug. 2, 2013 (no English translation provided).
U.S. Appl. No. 12/545,796, Office Action mailed Jun. 28, 2013.
U.S. Appl. No. 12/545,796, Final Office Action mailed Jan. 31, 2014.
Aboba, Bernard, "Virtual Access Points", IEEEP802.11 Wireless LANs, doc: IEEE 802.11-03/154r1, May 22, 2003, pp. 1-13. XP002425027.
U.S. Appl. No. 12/562,061, Office Action mailed Sep. 23, 2014.
U.S. Appl. No. 12/562,061, Final Office Action mailed Apr. 28, 2015.
U.S. Appl. No. 14/177,634, Office Action mailed Jul. 13, 2015.
U.S. Appl. No. 12/545,796, Office Action mailed Jan. 2, 2015.
European Application No. 05776630.5 First Examination Report Communication 94(3) dated Jun. 12, 2014.

\* cited by examiner

600

| Transmission Attempt 610 | Physical Layer Data Rate 620 | Antenna Configuration 630 | Transmit Power 640 |
|---|---|---|---|
| 0 | 54 Mbps | 22 | 12 dBm |
| 1 | 54 Mbps | 23 | 18 dBm |
| 2 | 54 Mbps | 18 | 18 dBm |
| 3 | 48 Mbps | 18 | 18 dBm |
| 4 | 24 Mbps | 22 | 18 dBm |
| 5 | 11 Mbps | 23 | 18 dBm |

| Transmission Attempt 710 | Physical Layer Data Rate 720 | Antenna Configuration 730 | Transmit Power 740 | Yield on Failure 750 |
|---|---|---|---|---|
| 0 | 54 Mbps | 22 | 12 dBm | No |
| 1 | 54 Mbps | 23 | 18 dBm | No |
| 2 | 54 Mbps | 18 | 18 dBm | Yes |
| 3 | 48 Mbps | 18 | 18 dBm | Yes |
| 4 | 24 Mbps | 22 | 18 dBm | Yes |
| 5 | 11 Mbps | 23 | 18 dBm | Yes |

FIGURE 7

TRANSMISSION AND RECEPTION PARAMETER CONTROL

CROSS-REFERENCE TO RELATED APPLICATIONS

The present application is a divisional and claims the priority benefit of U.S. patent application Ser. No. 12/545,796 filed Aug. 21, 2009, which is a divisional and claims the priority benefit of U.S. patent application Ser. No. 11/474,057 filed Jun. 23, 2006, now issued as U.S. Pat. No. 7,933,628, which is a continuation-in-part and claims the priority benefit of U.S. patent application Ser. No. 11/180,329 filed Jul. 12, 2005, now issued as U.S. Pat. No. 7,899,497, which claims the priority benefit of U.S. provisional patent application No. 60/602,711 filed Aug. 18, 2004, U.S. provisional patent application No. 60/603,157 filed Aug. 18, 2004, U.S. provisional patent application No. 60/625,331 filed Nov. 5, 2004; U.S. patent application Ser. No. 11/474,057 claims the priority benefit of U.S. provisional patent application No. 60/693,698 filed Jun. 23, 2005. The disclosures of all of the aforementioned application are incorporated herein by reference.

The present application is related to U.S. patent application Ser. No. 11/010,076 filed Dec. 9, 2004, U.S. patent application Ser. No. 11/022,080 filed Dec. 23, 2004, U.S. patent application Ser. No. 11/041,145 filed Jan. 21, 2005, and U.S. provisional patent application No. 60/630,499 filed Nov. 22, 2004. The disclosures of the aforementioned applications are incorporated herein by reference.

BACKGROUND OF THE INVENTION

Technical Field

The present invention generally relates to wireless communication networks and more particularly to a system and method for wireless network transmission parameter control providing for increased packet-reception.

Description of the Related Art

In communications systems, there is an ever-increasing demand for higher data throughput and a corresponding drive to reduce interference that can disrupt data communications. For example, in an IEEE 802.11 network, an access point (e.g., a base station) communicates data with one or more remote receiving nodes over a wireless link. The wireless link may be susceptible to, for example, interference from other access points, other radio transmitting devices, or disturbances in the environment of the wireless link between the access point and the remote receiving node. The interference may be to such a degree as to degrade the wireless link, for example, by forcing communication at a lower data rate. The interference also may be sufficiently strong enough to completely disrupt the wireless link.

One method for reducing interference in the wireless link between the access point and the remote receiving node is to provide several omni-directional antennas for the access point in a "diversity" scheme. For example, a common configuration for the access point comprises a data source coupled via a switching network to two or more physically separated omni-directional antennas. The access point may select one of the omni-directional antennas by which to maintain the wireless link. Because of the separation between the omni-directional antennas, each antenna experiences a different signal environment and each antenna contributes a different interference level to the wireless link. The switching network couples the data source to whichever of the omni-directional antennas experiences the least interference in the wireless link.

Current methods that provide switching among antenna configurations, such as diversity antennas, and previous methods of controlling antenna segments are unable to effectively minimize the interference from other access points, other radio transmitting devices, or disturbances in the environment of the wireless link between the access point and the remote receiving node. Typically, methods for antenna configuration selection are of the trial-and-error approach. In a trial-and-error approach, a transmission is made on each antenna configuration to determine which antenna configuration provides a more effective wireless link (e.g., as may be measured by a packet error ratio). The trial-and-error approach is inefficient as it generally requires transmission on a "bad" antenna configuration to determine the poor quality of that antenna configuration. Further, the trial-and-error approach becomes increasingly inefficient with a large number of antenna configurations.

Additionally, current methods may require measurements of parameters such as voltage standing wave ratio, signal quality, or bit error rate for each antenna configuration. Such measurements can take a significant amount of time to compute, and may require large numbers of data packets to be transmitted before the measurements can be performed.

SUMMARY OF THE INVENTION

In one exemplary embodiment of the present invention, a method for implementing transmission parameter control at a transmitting station is described. The exemplary method comprises querying a transmission parameter control module for a transmission schedule. The transmission schedule comprises at least one schedule entry defining a set of transmission parameter controls as they pertain to a destination address. At least one packet of data is then transmitted to the destination address according to the transmission parameter controls of at least one schedule entry from the transmission schedule.

In another embodiment of the aforementioned method, an acknowledgment of receipt of the data by a receiving station is issued and the transmission schedule may be updated based on certain feedback data. In the event that an acknowledgement is not received, the transmission schedule may be referenced to determine whether an unused entry exists that may be utilized for re-transmitting the data. If that re-transmission is successful, feedback data may again be utilized to update the transmission schedule. Should there not be an unused entry or the re-transmission fails, feedback with regard to the failed transmission may be incorporated into the evolution and development of the transmission schedule and particular entries therein.

An exemplary machine-readable medium for executing a similar transmission parameter control methodology is disclosed.

An exemplary system for transmission parameter control in a wireless network is also disclosed. A process executes at least one program comprising instructions for executing a transmission schedule, the transmission schedule comprising at least one schedule entry defining a set of transmission parameter controls as they pertain to a destination address. An antenna apparatus, in accordance with the transmission schedule, then transmits one or more data packets to a destination address utilized a particular antenna configuration and physical data rate.

Another exemplary system is disclosed by the present invention, that system configured to select an antenna configuration corresponding to a next transmission of packet data. In the exemplary system, a master scheduling module causes an antenna apparatus to adopt a particular radiation configuration in anticipation of the receipt of data from a transmitting station, the configuration corresponding to optimizing the receipt of data from that station. The configuration may be implemented in response to, for example, an algorithm executed by a packet pattern recognition module, a CRC module, a scheduled MAC module, a temporal prediction module, a last transmission module, and/or combinations of the same. Various methods as they pertain to adopting a particular configuration with respect to the aforementioned system modules are also disclosed.

BRIEF DESCRIPTION OF THE DRAWINGS

FIG. 6 illustrates an exemplary transmission schedule comprising transmission attempt, physical layer data rate, antenna configuration, and transmit power information;

FIG. 7 illustrates an exemplary transmission schedule like that disclosed in FIG. 6 and further comprising yield on failure information;

DETAILED DESCRIPTION

A system for a wireless (e.g., radio frequency or RF) link to a remote receiving device in accordance with an embodiment of the present invention generally includes a communication device for generating an RF signal, an antenna apparatus with selectable antenna elements for transmitting and/or receiving the RF signal, and a processor for controlling the communication device and the antenna apparatus. The communication device (or a device communicatively coupled thereto) converts data packets into RF at one of a plurality of selectable physical data rates. Each antenna element of the antenna apparatus may provide gain (with respect to an isotropic antenna) and a directional radiation pattern and may be electrically selected (e.g., switched on or off) so that the antenna apparatus may form a configurable (i.e., direction agile) radiation pattern. The processor may select the antenna configuration so that interference may be minimized in the wireless link to the remote receiving node. The processor may also select the physical data rate to maximize data transmission speed.

For example, due to interference from other radio transmitting devices, or disturbances in the wireless link between the system and the remote receiving device, the processor may select an antenna configuration with a resulting radiation pattern that minimizes the interference. The processor may also select an antenna configuration corresponding to a maximum gain between the system and the remote receiving device. Alternatively, the processor may select an antenna configuration corresponding to less than maximal gain but corresponding to reduced interference in the wireless link. Similarly, the processor may select a physical data rate that maximizes data transmission speed (i.e., effective user data rate) over the wireless link to the remote receiving device.

Figure 1:
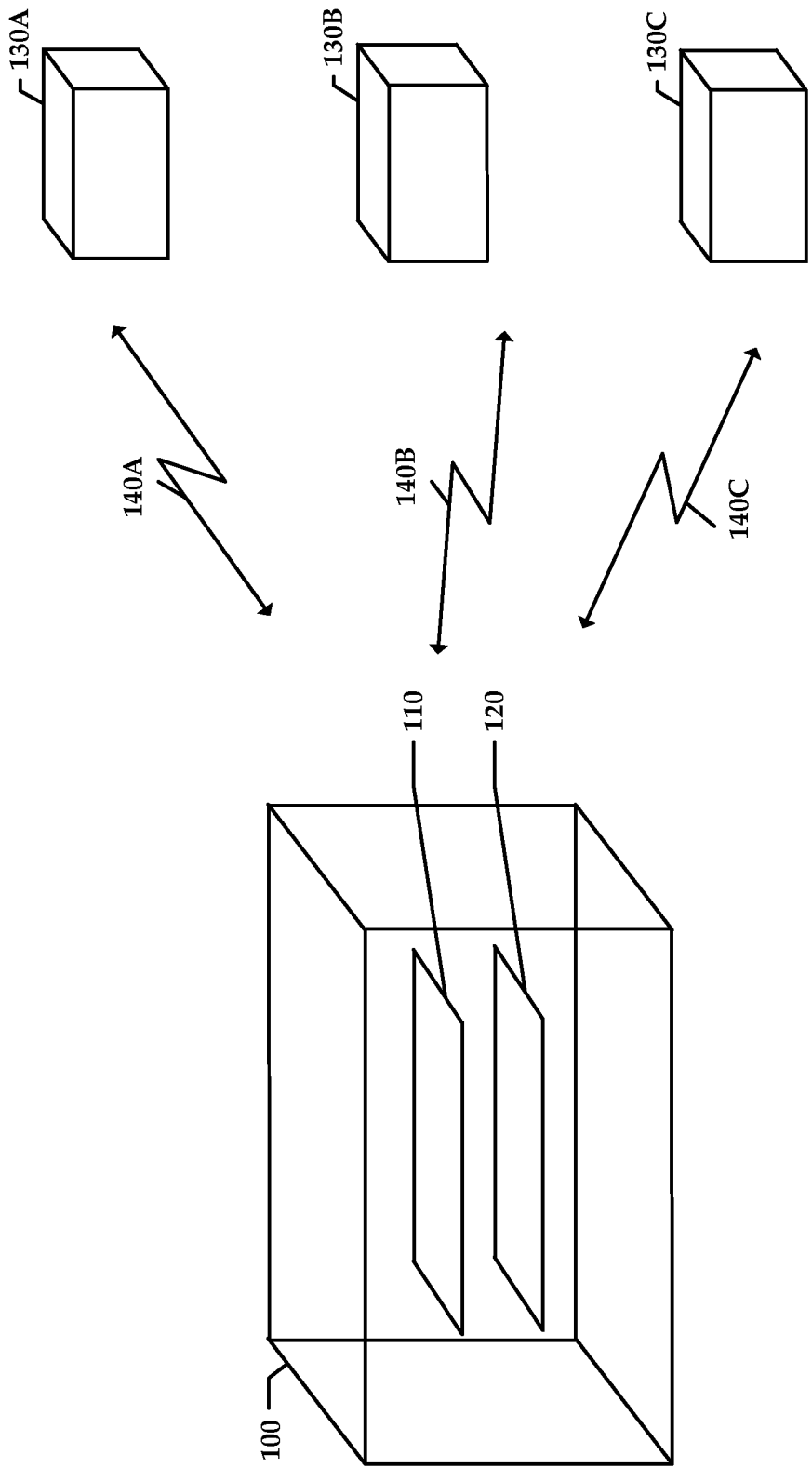
FIG. 1 illustrates a system comprising an antenna apparatus with selectable elements in accordance with one exemplary embodiment of the present invention.

FIG. 1 illustrates a system 100 comprising an antenna apparatus with selectable elements in accordance with one exemplary embodiment of the present invention. The system 100 may comprise, for example, a transmitter and/or a receiver, and be embodied as an 802.11 access point, an 802.11 receiver, a set-top box, a laptop computer, a television, a PCMCIA card, a remote control, or a remote terminal such as a handheld gaming device. In some exemplary embodiments, the system 100 may comprise an access point for communicating with one or more remote receiving nodes over a wireless link, for example, in an 802.11 wireless network. Typically, the system 100 may receive data from a router connected to a wide-area network such as the Internet (not shown) or any variety of local area networks (also not shown). The system 100 may transmit the data to one or more remote receiving nodes (e.g., receiving nodes 130A-130C). The system 100 may also form a part of a wireless local area network (LAN) by enabling communications among two or more of the remote receiving nodes 130A-130C.

Although the present disclosure focuses on particular embodiments for the system 100, aspects of the invention are equally applicable to a wide variety of appliances and are not intended to be limited to any disclosed embodiment. For example, although the system 100 will be described as the access point for an 802.11 wireless network, the system 100 may also comprise the remote receiving node 130A. Further, the system 100 may also be implemented with regard to other wireless network standards (e.g., IEEE 802.x).

System 100 may include a communication device 120 (e.g., a transceiver) and an antenna apparatus 110. The communication device 120 may comprise virtually any device for converting data at a physical data rate and for generating and/or receiving a corresponding RF signal. The communication device 120 may include, for example, a radio modulator/demodulator for converting data received by the system 100 (e.g., from a router) into the RF signal for transmission to one or more of the remote receiving nodes 130A-130C. In some embodiments of the present invention, the communication device 120 also comprises circuitry for receiving data packets of video from the router and circuitry for converting the data packets into 802.11 compliant RF signals. Various other hardware and/or software devices and/or elements may be integrated with communication device 120 (e.g., physical integration or a communicative coupling) as to allow for the processing and/or conversion of various other data formats into 802.11 compliant RF signals.

The antenna apparatus 110 may include a plurality of individually selectable antenna elements (not shown). When selected, each of the individual antenna elements produces a directional radiation pattern with gain (as compared to an omni-directional antenna). The antenna apparatus 110 may further include an antenna element selector device 310 (FIG. 3) to selectively couple one or more of the antenna elements to the communication device 120. Various embodiments of an antenna apparatus 110 and the antenna element selector device 310 are disclosed in U.S. patent application Ser. Nos. 11/010,076; 11/022,080; and 11/041,145 for a "System and Method for an Omni-directional Planar Antenna Apparatus with Selectable Elements," "Circuit Board Having a Peripheral Antenna Apparatus with Selectable Antenna Elements," and "System and Method for a Minimized Antenna Apparatus with Selectable Elements." The disclosure of each of these applications and the antenna apparatus therein have previously been incorporated into the present application by reference.

Figure 2:
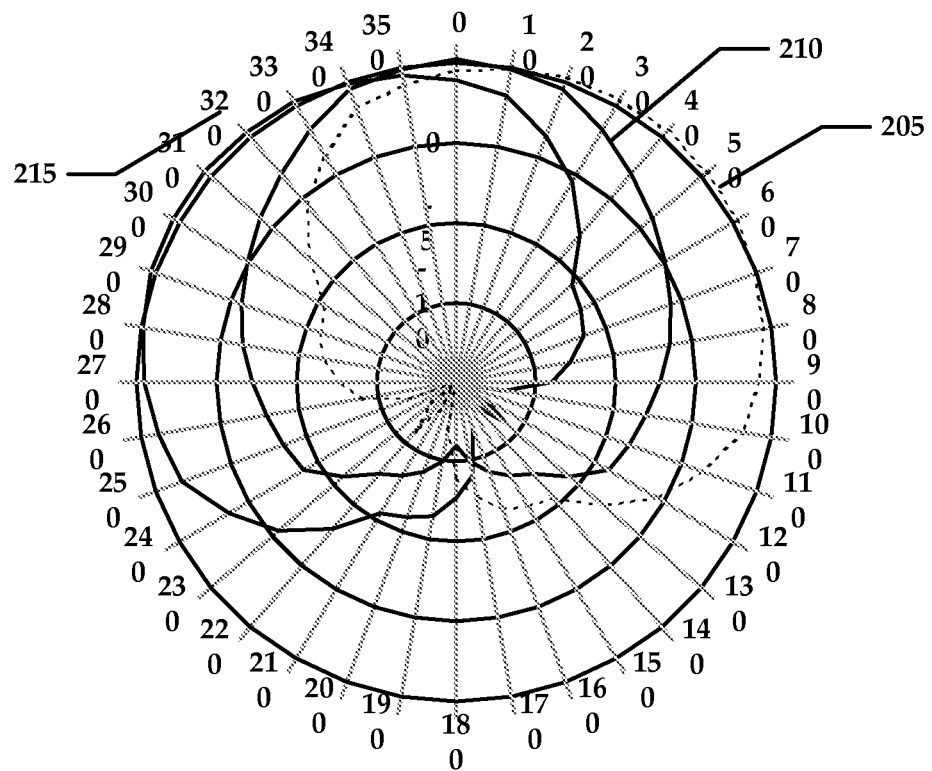
FIG. 2 illustrates various radiation patterns resulting from selecting different antenna configurations of the antenna apparatus of FIG. 1 in accordance with one exemplary embodiment of the present invention.

FIG. 2 illustrates various radiation patterns resulting from selecting different antenna configurations of the antenna apparatus 110 of FIG. 1 in accordance with one exemplary embodiment of the present invention. The antenna apparatus 110 used to produce the exemplary radiation pattern of FIG. 2 comprises four selectable antenna elements {A|B|C|D}. The antenna elements (referred to as antenna elements A-D) of the present example are offset from one other by 90 degrees. Each antenna element of the present example produces a similar radiation pattern offset from the other radiation patterns (e.g., the radiation pattern of the antenna element A is offset by approximately 90 degrees from the radiation pattern of the antenna element B and so on). For clarity of explanation, only three exemplary radiation patterns are shown in FIG. 2.

A first radiation pattern 215 is produced by selecting the antenna element A. The radiation pattern is a generally cardioid pattern oriented with a center at about 315 degrees in azimuth. A second radiation pattern 205, depicted as a dotted line, is produced by selecting the antenna element B. Antenna element B is offset 90 degrees from antenna element A; the radiation pattern 205 is therefore oriented with a center at about 45 degrees in azimuth. A combined radiation pattern 210, depicted as a bold line, results from the selection of antenna element A and antenna element B. It will be appreciated that by selecting one or more of the antenna elements A-D in FIG. 2, fifteen radiation patterns can be produced by the antenna apparatus 110.

A substantially omni-directional radiation pattern that may be produced by selecting two or more of the antenna elements A-D is not shown in FIG. 2 (for the sake of clarity). Notwithstanding, it will be appreciated that the antenna apparatus 110 may produce a range of radiation patterns, ranging from highly directional to omni-directional. Accordingly, these resulting radiation patterns are also referred as antenna configurations.

Figure 3:
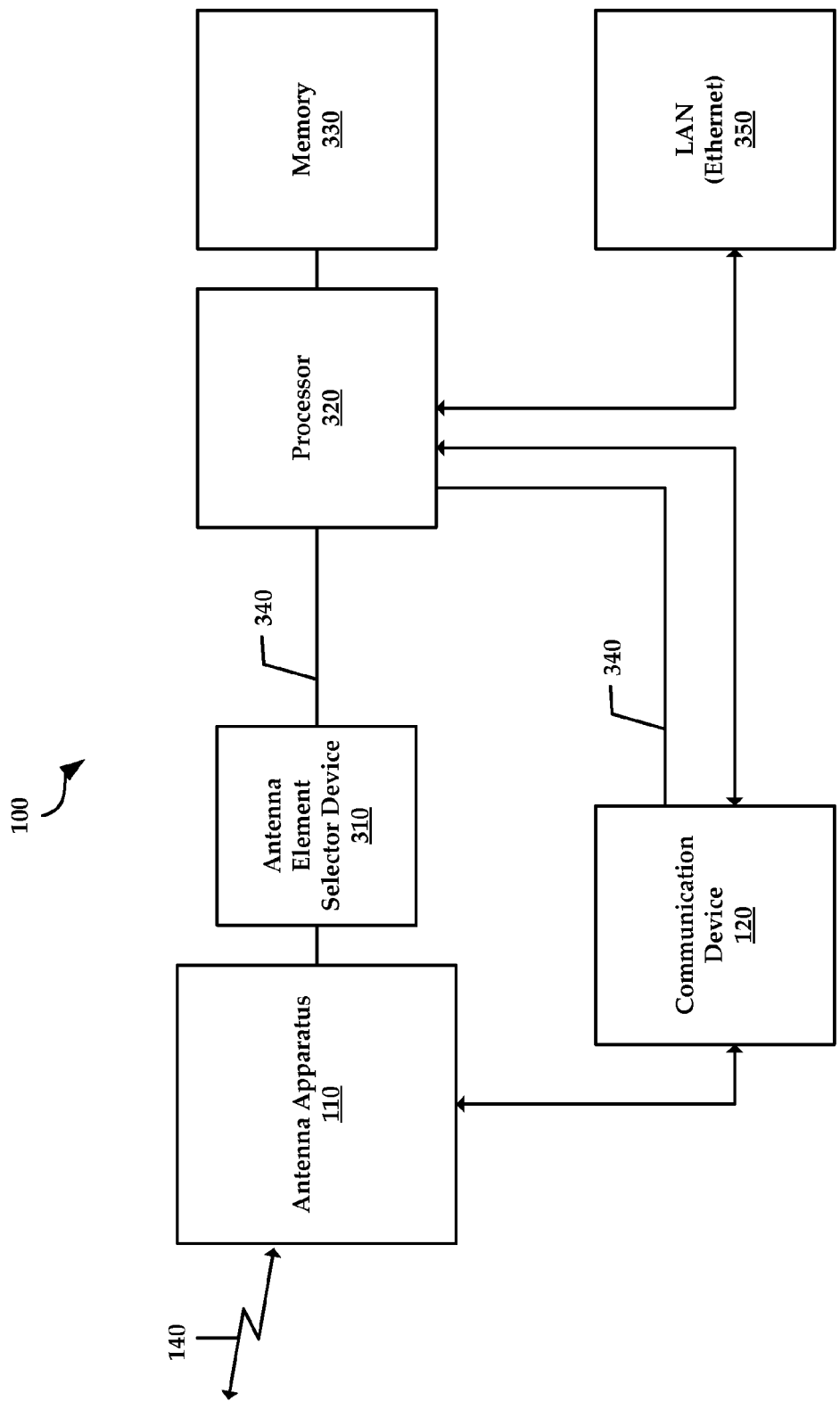
FIG. 3 illustrates an exemplary block diagram of the system of FIG. 1, in accordance with one exemplary embodiment of the present invention.

FIG. 3 illustrates an exemplary block diagram of the system 100, in accordance with one exemplary embodiment of the present invention. The system 100 may include a processor 320 coupled to a memory 330. In some embodiments of the present invention, the processor 320 may comprise a microcontroller, a microprocessor, or an application-specific integrated circuit (ASIC). The processor 320 may be configured to execute programs stored in the memory 330. The memory 330 may also store transmission schedules, which may specify transmit instructions including physical layer transmission rates for the communication device 120 and antenna configurations for the antenna apparatus 110. The transmissions schedule may also include additional information such as transmit power. The transmission schedule examples of which are illustrated in FIGS. 6 and 7-may be embodied as a program for execution by low-level hardware or firmware. The transmission schedule may also be embodied as a set of transmission metrics that allow for 'tuning' of transmission and retransmission processes in a more efficient manner.

The processor 320 may be further coupled to the antenna element selector device 310 by a control bus 340. The antenna element selector device 310 may be coupled to the aforementioned antenna apparatus 110 to allow, for example, selection from among the multiple radiation patterns described in FIG. 2. The processor 320 controls the antenna element selector device 310 to select an antenna configuration (i.e., one of the multiple radiation patterns) of the antenna apparatus 110. The antenna selector device 310 may accept and respond to information (instructions) related to a transmission schedule with regard to the selection of a particular antenna configuration (e.g., one of the aforementioned radiation patterns referenced in the context of FIG. 2).

The processor 320 is further coupled to the communication device 120 by the control bus 340. The processor 320 controls the communication device 120 to select a physical data rate (i.e., one of the multiple physical data rates). The processor 320 controls the physical data rate at which the communication device 120 converts data bits into RF signals for transmission via the antenna apparatus 110. The selection of a physical data rate may be associated with a particular antenna configuration, and/or other transmission parameters (e.g., transmit power) in the context of a transmission schedule like those referenced in FIGS. 6 and 7.

In some embodiments, the processor 320 may receive packet data, Transmission Control Protocol (TCP) packet data, or User Datagram Protocol (UDP) packet data from an external local area network (LAN) 350. The processor 320 may convert the TCP or UDP packet data into an 802.11 wireless protocol. The processor 320 may select an antenna configuration of the antenna apparatus 110 and sends the 802.11 wireless protocol to the communication device 120 for conversion at the physical data rate into RF for transmission via the antenna apparatus 110 to the remote receiving node (e.g., the remote receiving node 130A) over the wireless link (e.g., the wireless link 140A) in accordance with transmission parameters set forth in a particular transmission schedule.

An exemplary method executed by the processor 320 for selecting the antenna configuration may comprise creating and/or accessing a table having transmission parameter control data for each remote receiving node 130. The table may include link quality metrics for each antenna configuration. Some examples of link quality metrics are a success ratio, an effective user data rate, a received signal strength indicator (RSSI), and error vector magnitude (EVM) as are discussed in the context of U.S. patent application Ser. No. 11/180,329 (U.S. Pat. No. 7,899,497) and previously incorporated herein by reference. In an embodiment, the processor 320 may generate a table of success ratios for each antenna configuration using one or more link quality metrics. Each antenna configuration on the table may then be sorted using the corresponding success ratio. An antenna configuration can then be chosen from the sorted table. The table of success ratios can then be subsequently updated based on the outcome of the transmission.

An additional exemplary method executed by processor 320 may comprise querying transmission parameter control software for transmission parameters for a packet based on the packet destination address. The transmission parameter control software may specify transmit instructions including physical layer transmission rates and antenna configurations-in the context of a transmission schedule. The processor 320 may further modify or update a transmission schedule based on, for example, transmission attempt results as they pertain to a particular transmission schedule.

Figure 4:
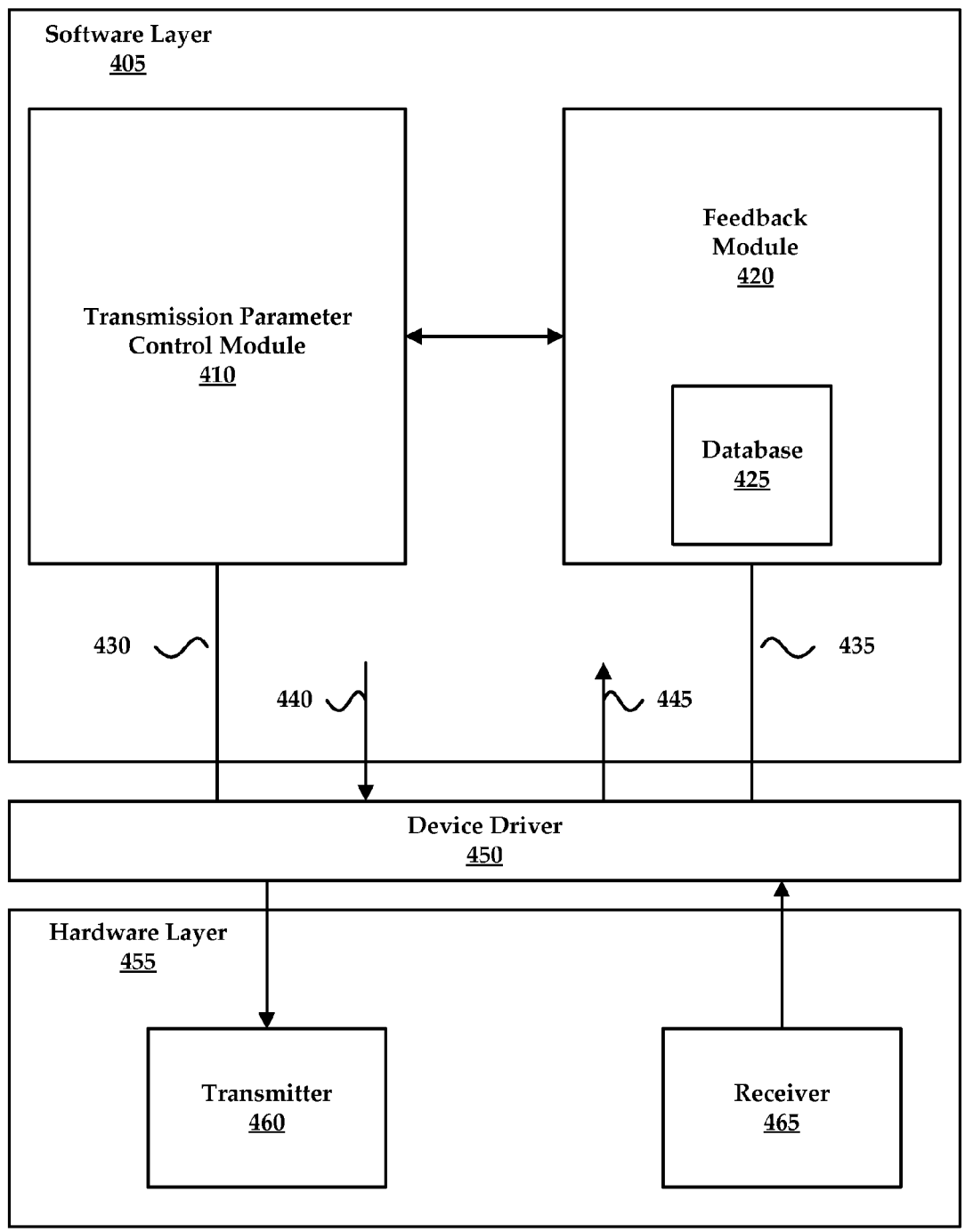
FIG. 4 illustrates a block diagram of an exemplary software layer, device driver, and a hardware layer of the system and for implementing transmission parameter control, in accordance with one exemplary embodiment of the present invention.

FIG. 4 illustrates a block diagram of an exemplary software layer 405, a device driver 450, and a hardware layer 455, in accordance with one exemplary embodiment of the present invention. The software layer 405 and the device driver 450 may comprise instructions executed by the processor 320 (in FIG. 3). The hardware layer 455 may comprise hardware elements of the system 100 described with respect to FIG. 3, such as the antenna selector device 310 and the communication device 120. Although described as software and hardware elements, aspects of the invention may be implemented with any combination of software, hardware, and/or firmware elements.

The software layer 405 may include a transmission parameter control module 410 and a feedback module 420. The feedback module 420 may include a database 425. The hardware layer 455 may include transmitter 460 and receiver 465.

The transmission parameter control module 410 may be linked to the feedback module 420. The transmission parameter control module 410 may communicate with the device driver 450 via link 430. The feedback module may communicate with the device driver 450 via link 435. The device driver 450 may receive packets via link 440 from the software layer 405 and sends the packets to the transmitter 460 in the hardware layer 455. The device driver 450 may also receive packets from the receiver 465 in the hardware layer 455 and sends the packets to the software layer 405 via link 445.

The transmission parameter control module 410 may comprise software elements configured to select for the device driver 450 the current antenna configuration and the current physical data rate based on the feedback module 420. In some embodiments of the present invention, the transmission parameter control module 410 may further comprise certain functionality as may be found in a transmission control selector like that disclosed in U.S. patent application Ser. No. 11/180,329 and previously incorporated herein by reference. Such a selector (and associated functionality) may be related to a probe scheduler. A probe scheduler may comprise software elements configured to determine for a transmission control selector an unused antenna configuration and an unused physical data rate based on predetermined criteria. One example of the predetermined criteria is determining an unused antenna configuration after the device driver 450 indicates as received 5 consecutive packets. The feedback module 420 of the present disclosure may comprise software elements configured to update link quality metrics for each antenna configuration and each physical data rate based on feedback from the device driver 450.

The transmission parameter control module 410 further provides transmission parameters for a packet based on the packet destination address. The transmission parameter control module 410 provides a transmission schedule, which may be stored in database 425 of feedback module 420 or in a database dedicated to the control module 410 (not shown). The transmission schedule specifies transmit instructions including physical layer transmission rates and antenna configurations. The transmission schedule is delivered to the device driver 450 in response to, for example, a driver query upon receipt of a unicast packet from an upper network layer by the driver 450. The driver 450, in turn, provides the data packet and transmission schedule to the hardware layer 455 for transmission.

The hardware layer 455 may notify the driver 450 of the result of the transmission attempt, which is in turn reported to the transmission parameter control module 410, the feedback module 420, or both modules for the purpose of updating the database 425, which may update a transmission schedule if deemed necessary. Certain functionality of the feedback module 420 may, in some embodiments, be integrated with the transmission parameter control module 410 with regard to updating a database 425 of transmission schedules. In such an embodiment, the feedback module 420 may be configured to maintain a separate dedicated database of transmission schedules in addition to being configured to maintain the link quality metrics in the database 425. The operation of the software layer 405, the device driver 450, and the hardware layer 455 are further described below.

An advantage of the system 100 is that the transmission parameter control module 410 may select a transmission schedule comprising, for example, an antenna configuration for the antenna apparatus 110 that minimizes interference for communicating over the wireless link 140A to the remote receiving node 130A based on feedback (i.e., direct or indirect) from the receiving node, which may be reflected by an acknowledgment resulting from the transmission. The device driver 450 may indicate whether the remote receiving node received transmitted packets on a particular antenna configuration and physical data rate. Further, the transmission parameter control module 410 may select another antenna configuration for communicating over the wireless link 140B to the remote receiving node 130B based on the lack of an acknowledgment and in accordance with a subsequent transmission schedule thereby changing the radiation pattern of the antenna apparatus 110 to minimize interference in the wireless link 140A and/or the wireless link 140B and/or to compensate for particular physical layer data rates.

The transmission parameter control module 410 may select the appropriate transmission schedule with an associated antenna configuration corresponding to a maximum gain for the wireless links 140A-140C. Alternatively, the transmission parameter control module 410 may select a transmission schedule wherein the antenna configuration corresponds to less than maximal gain but instead corresponds to reduced interference, in the wireless links 140A-140C. A further advantage is that transmission parameter control selection module 410 may select an accompanying physical data rate that provides the maximum effective user data rate at the remote receiving node 130A over the wireless link 140A.

The transmission schedule provided to the hardware layer 455 via device driver 450 may be provided as part of a transmit descriptor allowing granulated control over transmission and retransmission processes in an efficient manner. In some embodiments, the granulated control of transmission parameter control module 410 may be integrated with the functionality of a transmission control selector or alternatively operate in conjunction with the same.

Figure 5:
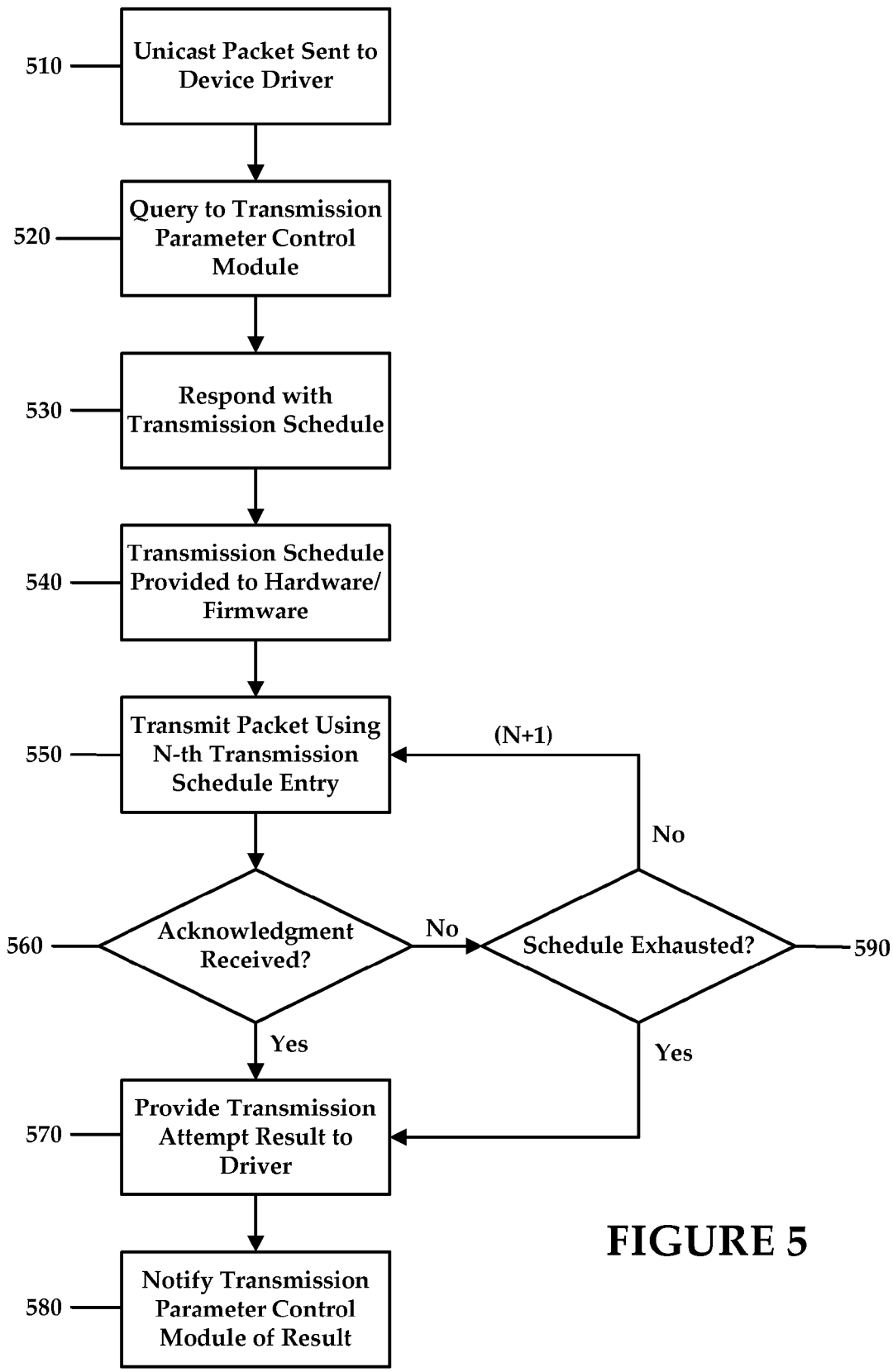
FIG. 5 illustrates an exemplary method for transmission packet flow in a system like that disclosed in FIG. 4.

FIG. 5 illustrates an exemplary method for transmission packet flow 500 in a system like that disclosed in FIG. 4 (400). In step 510, directed unicast packets are sent to device driver 450 from upper network layers for transmission. In step 520, the driver 450 queries the transmission parameter control module 410 for transmission parameters for the packet based on a packet destination address. The transmission parameter selection module 410 provides a transmission schedule (like those disclosed in FIGS. 6 and 7 below) in step 530. The transmission schedule specifies transmit instructions, including physical layer transmission rates and antenna configurations.

In step 540, the driver 450 provides the data packet and transmission schedule to the wireless network interface, which (in exemplary embodiments) may be embodied in the hardware layer 455. In step 550, the wireless network interface of the hardware layer 455 (for every N-th transmission attempt) transmits the packet using parameters from the N-th entry of the transmission schedule as illustrated in FIGS. 6 and 7. If the network interface of the hardware layer 455, in step 560, fails to receive an 802.11 layer acknowledgment, a determination is made as to whether the transmission schedule has been exhausted in step 590 (i.e., the transmission attempt schedule has entries that have not yet been utilized). If the acknowledgment is not received, in step 560, and it is determined that the transmission schedule has not been exhausted in step 590, the network interface of the hardware layer 455 will attempt to re-transmit the packet using parameters from a new entry of the transmission schedule (e.g., N+1) in a manner similar to the original transmission of step 550. The network interface of the hardware layer 455 will continue this cycle (steps 550, 560, 590, and returning to 550 if appropriate) of utilizing a new entry of the transmission schedule until an 802.11 layer acknowledgement is received in step 560 or until the schedule is exhausted (i.e., no unused scheduling entries remain) in step 590.

If an 802.11 layer acknowledgment is received in step 560, the present exemplary method proceeds to step 570 wherein the network interface of the hardware layer 455 informs the driver 450 of the results of the transmission attempt. The driver 450, in turn, notifies the transmission parameter control module 410 of the aforementioned transmission results in step 580. If an 802.11 layer acknowledgement is not received in step 560 and the schedule is exhausted (i.e., no unused scheduling entries remain) as determined in step 590, the driver 450 is informed of the results in step 570, which are, in turn, reported to the control module 410 in step 580.

FIG. 6 illustrates an exemplary transmission schedule 600 comprising transmission attempt 610, physical layer data rate 620, antenna configuration 630 and transmit power information 640. In an exemplary embodiment of the present invention, transmission schedule 600 may be stored in database 425 (FIG. 4) for each packet destination address. Each destination address may require different antenna configurations and/or physical data rates for optimal performance of each of the wireless links (140A-C), therefore multiple transmission schedules 600 may be developed and maintained. For ease of the present discussion, only a single transmission schedule 600 will be discussed.

The feedback module 420 (in FIG. 4) may update the transmission schedule 600 with respect to, for example, antenna configuration or physical layer data rate (columns 620 and 630) after the device driver 450 (in FIG. 4) indicates a packet as having been transmitted to a packet destination address in light of receipt of an 802.11 layer acknowledgment. The feedback module 420 may correlate a successful transmission rate (e.g., a success ratio) with respect to a particular physical data rate and antenna configuration on a particular transmission attempt for a particular packet destination address. Other link quality metrics may be associated with the transmission schedule 600 and an associated set of transmission parameters for a packet based on packet destination address such as receive signal strength indication (RSSI), voltage standing wave ratio (VSWR), signal quality, bit error rate, and error vector magnitude (EVM). Various methods of measuring the aforementioned metrics are discussed in U.S. patent application Ser. No. 11/180,329 and previously incorporated herein by reference.

Antenna configuration 630 corresponds to the multiple antenna configurations of the antenna apparatus 110. For example, a table of transmission control data for an antenna apparatus 110 having four selectable antenna elements {A, B, C, D}, would have fifteen possible antenna configurations comprising the set {A|B|C|D|AB|AC|AD|BC|BD|CD|AB-C|ABD|ACD|BCD|ABCD}. Indicia of a particular configuration may be associated with each one of the aforementioned configurations.

In one exemplary embodiment of the present invention, the schedule 600 may need only to comprise information related to transmission attempt 610, data rate 620, and antenna configuration 630. Certain other information, such as transmit power 640 (e.g., the power ratio in decibels (dB) of the measured power referenced to one milliwatt (mW)), may be optional. In that regard, other elements of information may be embodied in the transmission schedule 600 while remaining in general accord with the scope of the present invention.

The transmission schedule 600 is a program for execution by the hardware or firmware disclosed in FIG. 4. The schedule 600 may be provided to the network interface of the hardware or firmware 455 for execution in step 540 as part of a transmit descriptor, which allows for the driver 450 to exercise fine grained control over the transmission and retransmission process in an efficient manner.

In some embodiments of the present invention, it may be desirous for the transmission schedule 700 (FIG. 7) to further comprise yield on failure information 750 in addition to the aforementioned transmission attempt 710, physical layer data rate 720, antenna configuration 730, and transmit power 740 information. For example, if multiple packets are queued to different destinations and a particular destination is temporarily impaired, it may be advantageous to 'pause' the packet transmission to the impaired station, transmit the queued packets to another station, and then resume transmission to the impaired station.

The control offered by the presently disclosed system and associated transmission schedules offers functionality that may be referenced as a 'smart antenna.' Through the aforementioned transmission schedules as they related to a particular packet destination, it becomes possible to precisely control the antenna configuration and related transmission minutia during packet transmission such that an antenna array may 'point' in the direction of the receiving station. Further, the presently disclosed 'smart antenna' may further allow for the selection of a subsequent antenna configuration corresponding to a next transmission of packet data being received from a particular station. In this way, under certain conditions (such as when a transmission link is idle), the difficulties associated with passively listening for an incoming transmission and associated configurations are diminished.

Network protocols, as a whole, tend to be regular. As such, and through the use of one or more heuristic algorithms, it becomes possible to accurately predict the identity and/or location of a next transmitting station. The predictive results of the algorithms may themselves be embodied in a variety of schedules with respect to anticipated data packet reception.

An exemplary prediction algorithm may be based on a last transmission, which may be of particular use in—but is not limited to—a request/response data exchange or in those networks that have strong temporal locality. In such an embodiment, the receive antenna configuration is set based on the station to which the software-controlled smart antenna last transmitted. In such an embodiment, the receive antenna configuration 'follows' the transmit antenna configuration. Accordingly, the antenna configuration that was used to transmit data to a particular destination address may be the same configuration used to receive data from that address. Alternatively, it may be determined that data received from a particular destination address is ideally received in a particular configuration. Accordingly, if data is transmitted to a particular destination address, the antenna will automatically be reconfigured for an optimized configuration associated with receipt of data from that particular address following the initial data transmission.

Another exemplary prediction algorithm may be based on packet pattern recognition. Many protocols, such as transmission control protocol (TCP), generate a regular sequence of packets. In TCP, for example, two data packets are often followed by a TCP-level acknowledgment (ACK) packet in the reverse direction. A packet pattern recognition algorithm may be implemented such that, for each active flow, the number of transmitted packets that occur between received packets are counted. The 'smart antenna' then determines when an individual flow is expected for packet reception. The receive antenna may then be configured such that it corresponds to a station who's flow is 'due.'

A third exemplary prediction algorithm may be based on an indication of a cyclic redundancy check (CRC) with respect to a serial transmission of data. In a cyclic redundancy check, a CRC for a block of data is calculated before the data is sent; the CRC on that block of data is sent along with the primary data transmission. Once the data is received, a new CRC is calculated on the received data. If the pre-transmission CRC transmitted along with the primary block of data does not match the CRC performed after receipt of that data, then an error has occurred. For example, after a failed packet reception by the presently disclosed antenna, the hardware layer will notify the software of a CRC event.

In many instances, the packet data that was received is of sufficient quality that the source Media Access Control (MAC) (i.e., the unique 48-bit number used in Ethernet data packets to identify an Ethernet device, such as the base station) may be determined. The software of the presently disclosed antenna may then 'look up' the 'best' antenna configuration associated with the source MAC address and set the receive antenna configuration such that when the failed packet is retransmitted by the source, the packet will be received on the best antenna configuration for the station thereby possibly even alleviating the anomaly that resulted in the failed packet transmission in the first place.

A fourth exemplary prediction algorithm may be based on temporal prediction as a number of data flows, such as voice and video, are temporally periodic. By tracking packet inter arrival-times on a per-flow basis, the presently described antenna system may predict when in time a particular data flow will become active. A master schedule may then be compiled reflecting to activation times for particular active flows as they originate from a particular station. In such an embodiment, and in accordance with the master schedule, the receive antenna may be preemptively configured in advance of a particular flow from a particular locale at a particular time.

A fifth exemplary prediction algorithm may be based upon scheduled MAC. The 802.11 and 802.11e standards, the latter of which enhances the IEEE 802.11 MAC layer, specify optional modes of operation wherein the presently described 'smart antenna' may provide scheduling functionality normally associated with Time-Division Multiplexing (TDM), such as Hybrid Coordination Function Controlled Channel Access (HCCA).

HCCA is similar in operation to Point Coordination Function, wherein access points or Wi-Fi adapters send beacon frames at a regular interval; in between these beacons a Distributed Coordination Function (DCF) or Contention Free-Poll (CFPoll) packet function is implemented to control access to the transmission medium and/or to manage various QOS concerns. HCCA also utilizes the interval between beacon frames to control access to the medium and/or to operate in Enhanced DCF Channel Access wherein high priority traffic has a higher chance of being sent than low priority traffic. Unlike PCF, however, HCCA defines traffic classes such that traffic can be coordinated versus, for example, round-robin. The implementation of traffic classes also allows for station priority and transmit opportunity (TXOP) such that a particular access point my send as many frames as possible in a particular window of time.

Through the scheduled access functionality offered by HCCA and as may be implemented in the present 'smart antenna,' it may be determined which station will be transmitting at which time. As such, the antenna may be preemptively configured such that its configuration is the optimal configuration depending on a particular station scheduled to commence a transmission.

Figure 8:
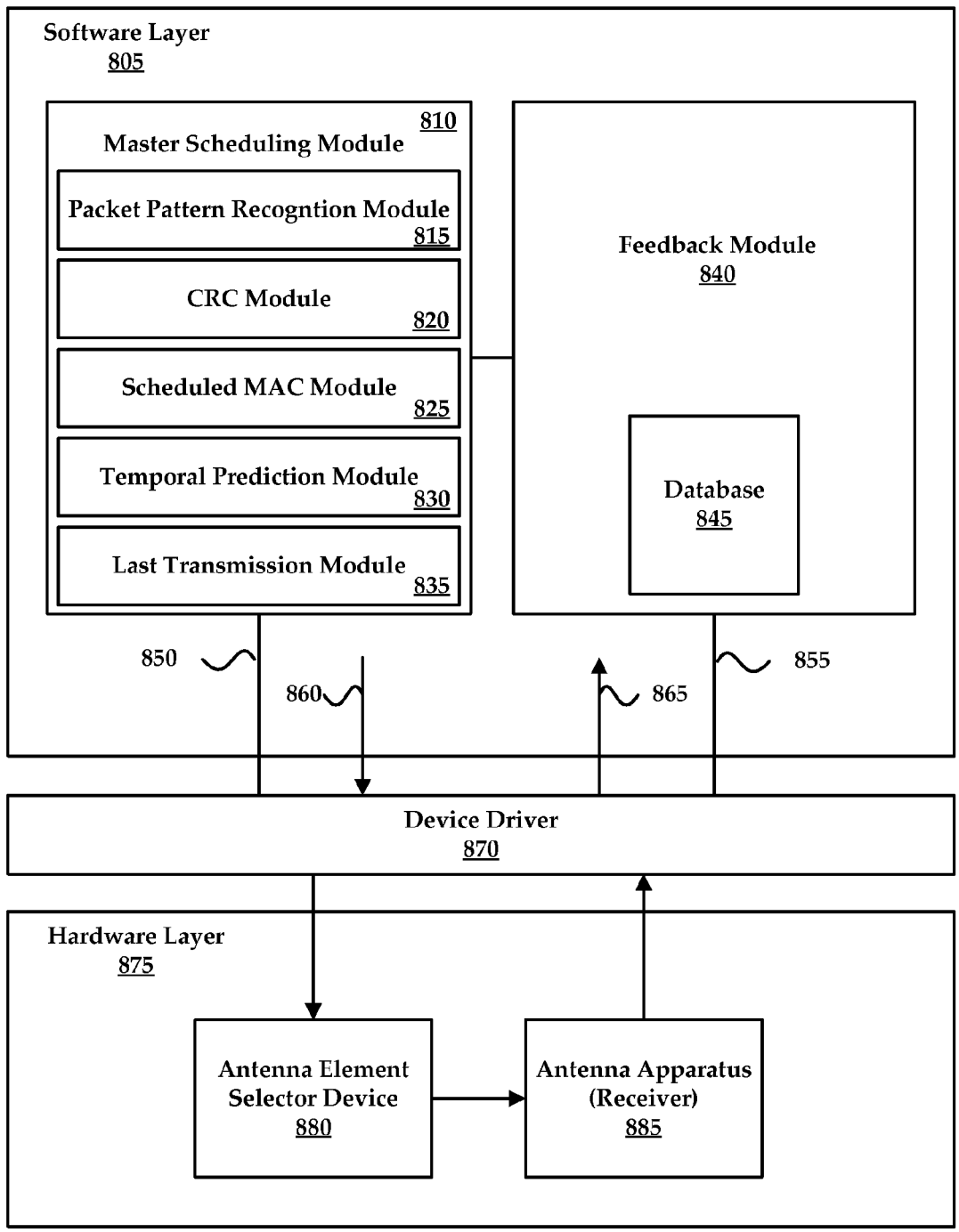
FIG. 8 illustrates a block diagram of an exemplary software layer, device driver, and a hardware layer of the system and for implementing reception parameter control, in accordance with one exemplary embodiment of the present invention.

Any of the aforementioned algorithms may be individually implemented for scheduling purposes. Alternatively, the various scheduling algorithms may be implemented to operate in parallel in various combinations. FIG. 8 illustrates a block diagram of an exemplary software layer 805, device driver 870, and hardware layer 875 of the system and for implementing reception parameter control, in accordance with one exemplary embodiment of the present invention.

Software layer 805 and device driver 870 may comprise instructions executed by the processor 320 (in FIG. 3). The hardware layer 875 may comprise hardware elements of the system 100 described with respect to FIG. 3, such as the antenna selector device 310, which is also depicted here as antenna element selector device 880, which is in turn coupled to antenna apparatus 885. Although described as software and hardware elements, aspects of the invention may be implemented with any combination of software, hardware, and/or firmware elements.

Master scheduling module 810 may comprise one or more subsidiary modules, which in turn may execute specific antenna selection algorithms or be executed in conjunction with another antenna selection module to determine a best algorithm. In FIG. 8, the exemplary master scheduling module 810 comprises a packet pattern recognition module 815, a CRC module 820, a scheduled MAC module 825, a temporal prediction module 830, and a last transmission module 835. The particular algorithm executed by each of these subsidiary modules has been discussed above in greater detail.

Master scheduling module 810 may comprise each of these modules, a selection of these modules, or additional modules not necessarily discussed here. After a particular antenna configuration has been identified by an antenna selection module, the master scheduling module 820 communicates this selection to the device driver 870, via link 850, which in turn causes the selector device 880 to implement a particular antenna configuration in a receiver of antenna apparatus 885. For example, processor 320 may cause the selector device 880 to select a particular configuration of antenna apparatus 110 in response to selection instructions received from scheduling module 810.

The particular selection of an antenna configuration may be recorded in database 845 of feedback module 840, which is coupled to the master scheduling module 810. Following the receipt of packet data utilizing the particular antenna configuration, feedback as to the quality of the packet reception may also be provided to the feedback module 840 via device driver 870 and hardware layer 875 through link 855. This feedback data, too, may be stored in database 845 and associated with the selection of that particular configuration as it pertains to certain network conditions, data conditions, and the like considered by the master scheduling module 810 and the responsible subsidiary module with regard to determining a particular antenna configuration to be used in the receipt of packet data.

Observations may be made over the course of several data receptions as they pertain to particular antenna configurations and transmitting stations and the feedback generated by the same. The feedback module may, over the course time, determine that particular modules may be more accurate with regard to the selection of a particular antenna configuration and, when a data transmission from a particular station is involved, cause the master scheduling module 810 to rely on a particular antenna configuration as determined by a particular module in order to more optimally select particular configurations.

The feedback module may periodically causes the master scheduling module 810 to select a configuration identified by a non-regular module (e.g., CRC versus temporal) in order to obtain a more relevant sample of feedback data as it pertains to particular stations, particular configurations, and particular modules electing the particular configuration. Such test sampling may occur as part of a regular data reception or may be the result of the module causing the transmission and subsequent reception of reply data during idle time whereby a regularly scheduled or in-progress transmission is not interrupted or possibly subjected to a less than ideal antenna configuration.

The invention has been described herein in terms of several exemplary embodiments. Other embodiments of the invention, including alternatives, modifications, permutations and equivalents of the embodiments described herein, will be apparent to those skilled in the art from consideration of the specification, study of the drawings, and practice of the invention. The embodiments and features described above should be considered exemplary, with the invention being defined only by the appended claims, which therefore include all such alternatives, modifications, permutations and equivalents as fall within the true spirit and scope of the present invention.

What is claimed is:

1. A system for transmission parameter control in a wireless network, the system comprising:
a processor that executes at least one program stored in a memory, the at least one program comprising instructions for executing a transmission schedule, wherein the transmission schedule comprising a plurality of schedule entries, wherein the plurality of schedule entries respectively defines a plurality of sets of transmission parameter controls associated with a destination address, wherein each set of transmission parameter controls corresponds to a respective transmission attempt for the destination address;
an antenna apparatus including a plurality of antenna elements adjustable into a plurality of antenna configurations, each antenna configuration corresponding to a radiation pattern;
a communication device that implements at least one of a plurality of link quality metrics as specified by a set of transmission parameter controls of the plurality of sets of transmission parameter controls, wherein the link quality metrics include data rate, success ratio, a received signal strength indicator (RSSI) and an error vector magnitude (EVM); and
an antenna element selector device that selects at least one of the antenna elements to implement the at least one of the plurality of antenna configurations of the antenna apparatus as specified by the set of transmission parameter controls, wherein the antenna apparatus transmits one or more data packets to the destination address in accordance with at least one of the data rates and at least one of the plurality of antenna configurations as specified by the set of transmission parameter controls of the transmission schedule executed by the processor, and wherein the antenna element selector device includes a prediction algorithm that is used to select a particular antenna element based on data packet pattern recognition or Cyclic Redundancy Check (CRC) of serial transmission of data.

2. The system of claim 1, the antenna apparatus receiving an acknowledgment of receipt of the transmitted one or more data packets in accordance with at least one schedule entry of the plurality of schedule entries.

3. The system of claim 2, the at least one program comprising instructions for providing feedback data related to the transmission of the one or more data packets in accordance with the at least one schedule entry of the plurality of schedule entries associated with the acknowledged transmission.

4. The system of claim 3, the at least one program comprising instructions for updating the at least one schedule entry of the plurality of schedule entries associated with the acknowledged transmission according to the feedback data.

5. The system of claim 1, the at least one program comprising instructions for:
determining that an acknowledgment of receipt of the transmitted at least one data packet has not been received by the transmitting station; and
searching the transmission schedule for an unused schedule entry for re-transmission of the at least one data packet.

6. The system of claim 5, wherein the transmission schedule includes an unused schedule entry, and wherein the at least one program comprises instructions for re-transmitting the at least one data packet in accordance with the set of transmission parameter controls of the unused schedule entry.

7. The system of claim 6, the at least one program comprising instructions for receiving an acknowledgment of receipt of the re-transmitted at least one data packet in accordance with the unused schedule entry.

8. The system of claim 7, the at least one program comprising instructions for providing feedback data related to the re-transmission of the at least one data packet with respect to the at least one schedule entry of the plurality of schedule entries associated with the acknowledged re-transmission.

9. The system of claim 8, the at least one program comprising instructions for updating the at least one schedule entry of the plurality of schedule entries associated with the acknowledged re-transmission according to the feedback data.

10. The system of claim 5, wherein the transmission schedule does not include an unused schedule entry and wherein the at least one program comprises instructions for providing feedback data indicating failed transmission of the at least one data packet with respect to the at least one schedule entry of the plurality of schedule entries associated with the failed transmission.

11. The system of claim 10, the at least one program comprising instructions for updating the at least one schedule entry of the plurality of schedule entries associated with the failed transmission according to the feedback data.

12. A machine-readable non-transitory storage medium having embodied thereon a program, the program being executable by a processor to perform a method for implementing transmission parameter control at a transmitting station, the method comprising:

querying a transmission parameter control module for a transmission schedule, the transmission schedule comprising a plurality of schedule entries, wherein the plurality of schedule entries respectively defines a plurality of sets of transmission parameter controls associated with a destination address, and wherein each set of transmission parameter controls corresponds to a respective transmission attempt for the destination address;

configuring a communication device to implement at least one link quality metric as specified by a set of transmission parameter controls of the plurality of sets of transmission parameter controls, wherein the link quality metric includes data rate, success ratio, a received signal strength indicator (RSSI) and an error vector magnitude (EVM);

configuring an antenna apparatus including a plurality of antenna elements to form a particular radiation pattern as specified by the set of transmission parameter controls, wherein the configuring is based on a prediction algorithm that is used to select a particular antenna element based on data packet pattern recognition or Cyclic Redundancy Check (CRC) of serial transmission of data; and transmitting at least one packet of data to the destination address according to the set of transmission parameter controls of the transmission schedule.

13. The machine-readable non-transitory storage medium of claim 12, further comprising receiving at the transmitting station an acknowledgment of receipt of the transmitted at least one packet of data in accordance with at least one schedule entry of the plurality of schedule entries.

14. The machine-readable non-transitory storage medium of claim 13, further comprising providing feedback data related to the transmission of the at least one packet of data in accordance with the at least one schedule entry of the plurality of schedule entries associated with the acknowledged transmission.

15. The machine-readable non-transitory storage medium of claim 14, further comprising updating the at least one schedule entry of the plurality of schedule entries according to the feedback data.

16. The machine-readable non-transitory storage medium of claim 12, further comprising execution of instructions by the processor to:

determine that an acknowledgment of receipt of the transmitted at least one packet of data has not been received by the transmitting station; and search the transmission schedule for an unused schedule entry for re-transmission of the at least one packet of data.

17. The machine-readable non-transitory storage medium of claim 16, wherein the transmission schedule comprises an unused schedule entry, and the method further comprises re-transmitting the at least one packet in accordance with the transmission parameter controls of the unused schedule entry.

18. The machine-readable non-transitory storage medium of claim 17, the method further comprising receiving an acknowledgment of receipt of the re-transmitted at least one packet of data in accordance with the unused schedule entry.

19. The machine-readable non-transitory storage medium of claim 18, the method further comprising providing feedback data related to the re-transmission of the at least one packet of data with respect to the at least one schedule entry of the plurality of schedule entries associated with the acknowledged re-transmission.

20. The machine-readable non-transitory storage medium of claim 19, further comprising updating the at least one schedule entry of the plurality of schedule entries of the transmission schedule according to the feedback data.

21. The machine-readable non-transitory storage medium of claim 16, wherein the transmission schedule does not comprise an unused schedule entry, and the method further comprises providing feedback data indicating failed transmission of the at least one packet of data with respect to the at least one schedule entry associated with the failed transmission.

22. The machine-readable non-transitory storage medium of claim 21, further comprising updating the at least one schedule entry of the plurality of schedule entries of the transmission schedule according to the feedback data.

* * * * *